United States Patent
Han et al.

(10) Patent No.: US 11,368,563 B2
(45) Date of Patent: Jun. 21, 2022

(54) DATA TRANSMISSION METHOD, DEVICE AND NON-TRANSITORY COMPUTER READABLE STORAGE MEDIUM

(71) Applicant: SHENZHEN MENTAL FLOW TECHNOLOGY CO., LTD., Shenzhen (CN)

(72) Inventors: Bicheng Han, Shenzhen (CN); Chengbang Zhou, Shenzhen (CN)

(73) Assignee: SHENZHEN MENTAL FLOW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/038,344

(22) Filed: Sep. 30, 2020

(65) Prior Publication Data

US 2021/0014342 A1    Jan. 14, 2021

Related U.S. Application Data

(63) Continuation of application No. PCT/CN2019/084243, filed on Apr. 25, 2019.

(30) Foreign Application Priority Data

May 8, 2018   (CN) .......................... 201810433993.X

(51) Int. Cl.
*H04L 69/22*    (2022.01)

(52) U.S. Cl.
CPC .................................. *H04L 69/22* (2013.01)

(58) Field of Classification Search
None
See application file for complete search history.

(56) References Cited

U.S. PATENT DOCUMENTS

| 9,549,197 | B2 | 1/2017 | Messmer et al. |
| 2012/0170596 | A1* | 7/2012 | Hwang ................. H04L 65/608 370/471 |

(Continued)

FOREIGN PATENT DOCUMENTS

| CN | 101395911 A | 3/2009 |
| CN | 101645883 A | 2/2010 |

(Continued)

OTHER PUBLICATIONS

First Office Action in counterpart Chinese Application No. 201810433993.X, dated Dec. 3, 2019.

(Continued)

*Primary Examiner* — James A Edwards
(74) *Attorney, Agent, or Firm* — Westbridge IP LLC

(57) ABSTRACT

Disclosed is a data transmission method including the following operations: generating, by a transmitting terminal, a data packet according to a preset generation rule, and transmitting the data packet to a receiving terminal in a streaming transmission way, wherein the data packet at least comprises a header identification code, sub-packet quantity information, data packet byte sum quantity information, a check bit, at least one sub-packet and an end-of-packet identification code; parsing, by the receiving terminal, the received data packet according to a preset parsing rule to extract the at least one sub-packet in the data packet; creating, by the receiving terminal, a data packet object, and establishing an internal link to each extracted sub-packet. The present disclosure also discloses a data transmission device and a computer readable storage medium. With the present disclosure, a starting position and an ending position of data can be determined and confusion of a data structure can be avoided.

14 Claims, 5 Drawing Sheets

(56) References Cited

U.S. PATENT DOCUMENTS

| | | | | |
|---|---|---|---|---|
| 2016/0219024 A1* | 7/2016 | Verzun | ................ | H04L 63/0464 |
| 2018/0205652 A1* | 7/2018 | Saxena | ............... | H04L 61/2557 |
| 2019/0215306 A1* | 7/2019 | Gopal | ................ | G06F 9/45558 |

FOREIGN PATENT DOCUMENTS

| | | | |
|---|---|---|---|
| CN | 101662335 | A | 3/2010 |
| CN | 102647252 | A | 8/2012 |
| CN | 102761391 | A | 10/2012 |
| CN | 103532668 | A | 1/2014 |
| CN | 103607264 | A | 2/2014 |
| CN | 103701562 | A | 4/2014 |
| CN | 105117253 | A | 12/2015 |
| CN | 105530191 | A | 4/2016 |
| CN | 106850149 | A | 6/2017 |
| CN | 108737026 | A | 11/2018 |
| WO | 2014026370 | A1 | 2/2014 |

OTHER PUBLICATIONS

International Search Report and Written Opinion in corresponding PCT Application No. PCT/CN2019/084243, dated Jul. 31, 2019.

* cited by examiner

DATA TRANSMISSION METHOD, DEVICE AND NON-TRANSITORY COMPUTER READABLE STORAGE MEDIUM

CROSS REFERENCE TO RELATED DISCLOSURES

The present disclosure is a continuation application of PCT application No. PCT/CN2019/084243, filed on Apr. 25, 2019, which claims the benefits of Chinese patent application No. 201810433993.X, filed on May 8, 2018, entitled "DATA TRANSMISSION METHOD AND DEVICE, AND COMPUTER READABLE STORAGE MEDIUM". the entirety of which is hereby incorporated herein by reference.

TECHNICAL FIELD

The present disclosure relates to the technical field of data transmission, in particular to a data transmission method, a data transmission device and a computer readable storage medium.

BACKGROUND

With the development of science and technology, people have higher requirements for data transmission of various data transmission systems. At present, there is a streaming technology through which data to be transmitted can be processed so as to continuously carry out data transmission. However, in the prior data transmission technology, the transmitted data packet typically only includes related information such as "packet size" and "packet content", the starting position and the ending position of the data are not easily determined in the data transmission process, and the data structure disorder is easily caused.

SUMMARY

The main purpose of the present disclosure is to provide a data transmission method and a data transmission device, and a computer readable storage medium, aiming to solve the problem that an existing data transmission technology is not easy to find the starting position and the ending position of the data and is easy to cause confusion of the data structure.

In order to achieve the above object, the present disclosure provides a data transmission method, the data transmission method including:

generating, by a transmitting terminal, a data packet according to a preset generation rule, and transmitting the data packet to a receiving terminal in a streaming transmission way, wherein the data packet at least comprises a header identification code, sub-packet quantity information, a data packet byte sum quantity information, a check bit, at least one sub-packet and an end-of-packet identification code;

parsing, by the receiving terminal the received data packet according to a preset parsing rule to extract the at least one sub-packet in the data packet;

creating, by the receiving terminal, a data packet object, and establishing an internal link to each extracted sub-packet.

In order to achieve the above purpose, the present disclosure further provides a data transmission device. In particular, the data transmitting device at least includes a storage, a processor, and a data transmission program stored on the storage, when the data transmission program is preformed by the processor, executing the following operations:

generating, by a transmitting terminal, a data packet according to a preset generation rule, and transmitting the data packet to a receiving terminal in a streaming transmission way, wherein the data packet at least comprises a header identification code, sub-packet quantity information, a data packet byte sum quantity information, a check bit, at least one sub-packet and an end-of-packet identification code;

parsing, by the receiving terminal the received data packet according to a preset parsing rule to extract the at least one sub-packet in the data packet;

creating, by the receiving terminal, a data packet object, and establishing an internal link to each extracted sub-packet.

Optionally, when the data transmission program is preformed by the processor, the following operations are executed:

parsing, by the receiving terminal, received data stream according to the preset parsing rule, obtaining a first data block which is same as the header identification code in the data stream, wherein a byte quantity of the first data block is a first preset byte quantity;

obtaining a second data block of a second preset byte quantity behind the first data block, and performing data verification based on the second data block;

when the data verification is correct, obtaining the sub-packet quantity information and the data packet byte sum quantity information from the second data block;

extracting the at least one sub-packet based on the sub-packet quantity information, the data packet byte sum quantity information, and the data behind the second data block.

In addition, in order to achieve the above object, the disclosure also provides a data transmission computer readable storage medium, where a data transmission program is stored on the computer readable storage medium, and the data transmission program is executed by the processor to realize the operations of the data transmission method as described above.

Provided in the present disclosure is a data transmission method, the data transmission method including: generating, by a transmitting terminal, a data packet according to a preset generation rule, and transmitting the data packet to a receiving terminal in a streaming transmission way, wherein the data packet at least comprises a header identification code, sub-packet quantity information, a data packet byte sum quantity information, a check bit, at least one sub-packet and an end-of-packet identification code; parsing, by the receiving terminal the received data packet according to a preset parsing rule to extract the at least one sub-packet in the data packet; creating, by the receiving terminal, a data packet object, and establishing an internal link to each extracted sub-packet. By means above, the data packet generated based on a generation rule in the present disclosure includes a header identification code and an end-of-packet identification code, so that the starting position and the ending position of the data are determined in the data transmission process, the structure of the data packet and the position of the sub-packet can be accurately determined based on the sub-packet quantity information, the data packet byte sum quantity information and the check bits in the parsing process, the sub-packet in the data packet is accurately extracted, and the situation that the data structure is disordered is avoided.

DETAILED DESCRIPTION OF THE EMBODIMENTS

It should be understood that the specific embodiments described here are used merely to explain the present disclosure and are not intended to limit the present disclosure.

In the prior data transmission technology, the transmitted data packet generally includes a "packet size" and a "packet content", the starting position and the ending position of the data are not easy to be found, and the data structure disorder is easily caused.

In order to solve the technical problem above, the disclosure provides a data transmission method that a transmitting terminal generates a data packet according to a preset generation rule, the data packet is transmitted to a receiving terminal in a streaming mode. The data packet at least includes a header identification code and a sub-packet quantity information and data packet byte sum information and check bits, at least one sub-packet and an end-of-packet identification code. The receiving terminal parses received data stream according to a preset parsing rule, extracts a sub-packet in the data stream, establishes a data packet, and establishes an internal link to each extracted sub-packet, thereby a starting position or an ending position of the data packet are determined, avoiding confusion of the data structure.

Figure 1:
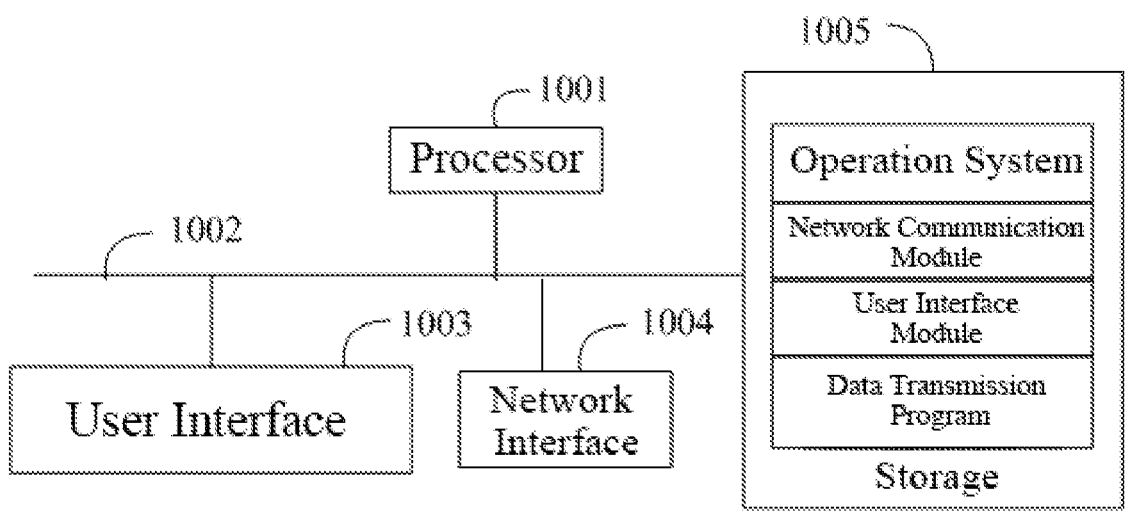
FIG. 1 is a schematic diagram of a terminal structure of a device in a hardware operating environment involved in an embodiment of the present disclosure.

As shown in FIG. 1, FIG. 1 is a schematic diagram of a device structure of a hardware operating environment involved in an embodiment of the present disclosure.

A terminal of the present embodiments can be a PC or a smart phone, a tablet computer, an e-book reader, an MP3 (Moving Picture Experts Group Audio Layer III), a Dynamic Image Expert Compression Standard Audio Level 3) player, an MP4 (Moving Picture Experts Group Audio Layer IV, a Dynamic Image Expert Compression Standard Audio Layer 4) player, a portable computer and the like which has a displaying function.

As shown in FIG. 1, the terminal may include a processor 1001, such as a CPU, a network interface 1004, a user interface 1003, a storage 1005, a communication bus 1002, in particular, the communication bus 1002 is used to implement connection and communications between these components. The user interface 1003 may include a display screen, an input unit such as a keyboard, and the user interface 1003 may optionally include a standard wired interface, and a wireless interface. The network interface 1004 may optionally include a standard wired interface, and a wireless interface (e.g., a Wi-Fi interface). The storage 1005 may be a high-speed RAM storage or a non-volatile storage, such as a disk storage. The storage 1005 may optionally be a storage device that is independent of the processor 1001 described above.

Alternatively, the device may also include a camera, a radio frequency (RF) circuit, a sensor, an audio circuit, a WiFi module, etc. The sensor includes such as a light sensor, a motion sensor, and another sensor. In particular, the light sensor can include an ambient light sensor and a proximity sensor, specifically the ambient light sensor can adjust a brightness of the display screen according to a brightness of ambient light, and the proximity sensor can close the display screen and/or the backlight when the mobile device moves to the ear. As one of the motion sensors, the gravity acceleration sensor can detect a magnitude and a direction of an acceleration in each direction (generally three-axis), the magnitude and direction of gravity can be detected when the gravity acceleration sensor is stationary, and the gravity acceleration sensor can be used in applications for identifying postures of a mobile device (such as horizontal vertical screen switching, related games, magnetometer attitude calibration), vibration recognition related functions (such as pedometer, knocking) and the like; of course, the mobile device can also be configured with other sensors such as a gyroscope, a barometer, a hygrometer, a thermometer, an infrared sensor and the like, the description of which is not repeated here.

It will be appreciated by those skilled in the art that the device structure shown in FIG. 1 does not constitute a definition of the terminal, which may include more or fewer components than illustrated, or combine certain components, or different component arrangements.

As shown in FIG. 1, an operating system, a network communication module, a user interface module, and a data transmission program may be included in the storage 1005 which is a computer readable storage medium.

In the terminal shown in FIG. 1, the network interface 1004 is mainly used for connecting a background server and performing data communication with a background server; the user interface 1003 is mainly used for connecting a client (user device) and performing data communication with the client; and the processor 1001 can be configured for calling a data transmission program stored in the storage 1005 and executing a data transmission method provided by the embodiments of the present disclosure.

Figure 2:
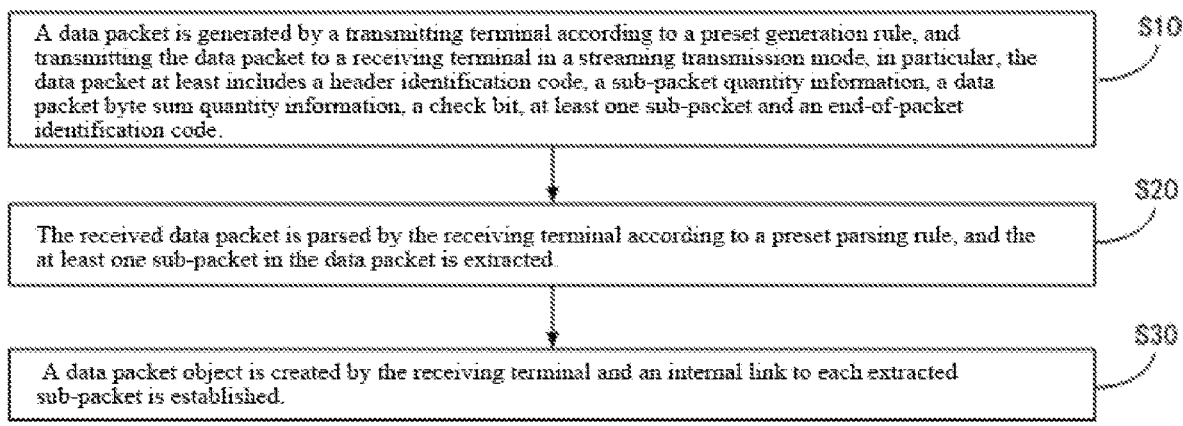
FIG. 2 is an illustrative flowchart of a first embodiment of a data transmission method according to the present disclosure.

Referring to FIG. 2, FIG. 2 is an illustrative flowchart of a first embodiment of the data transmission method according to the present disclosure.

With the development of science and technology, people have higher requirements for data transmission of various data transmission systems. At present, there is a streaming technology through which data to be transmitted can be processed so as to continuously carry out data transmission. However, in the existing transparent data streaming technology, the starting position and the ending position of the data are not easily determined in the data transmission process, and the data structure is easily disordered. The present disclosure is applied to the technical field of data transmission, for example, it can be applied to a transparent transmission module. The embodiments of the disclosure provides a data transmission encapsulation method applied to a relatively stable streaming interface, such as a computer serial terminal, a UART and TCP, etc., which are used for encapsulating application layer information, being able to determine the starting position or the ending position of the data, and avoids the confusion of the data structure. The implementation process of the embodiment includes the following operations.

Step S10, a data packet is generated by a transmitting terminal according to a preset generation rule, and transmitting the data packet to a receiving terminal in a streaming transmission mode, in particular, the data packet at least includes a header identification code, a sub-packet quantity information, a data packet byte sum quantity information, a check bit, at least one sub-packet and an end-of-packet identification code;

The data transmission method is suitable for data transmission between a reader-writer, a mobile terminal, a server and the like. In the embodiment, the data transmission method of the present disclosure is described in detail by using the data transmission between the reader-writer and the mobile terminal. In the embodiment, the mobile terminal is provided with upper-layer card-reading application software in advance and has an interface unit for being connected with the reader-writer. The mobile terminal includes, but is not limited to, a mobile phone, a PAD (tablet computer) and other terminal devices. After the mobile terminal is connected with the reader-writer through the interface unit, the interface unit can be, but is not limited to, a universal serial bus (USB) interface, a parallel interface, a UART (universal asynchronous transceiver) interface, an SPI (serial peripheral interface) interface, an I2C bus interface and the like. The preset generation rule in the embodiment refers to a rule for generating a data packet, namely a data encapsulation rule, which includes specific components and an arrangement sequence of packaging the specific components and. In the embodiment, the transmitting terminal packages the header identification code, the sub-packet quantity information, the data packet byte sum information, the check bits, the at least one sub-packet and the end-of-packet identification code into a data packet. In particular, the sub-packet includes a sub-packet header identification code, a sub-packet length and a sub-packet loading data. In the embodiment, the header identification code, the sub-packet quantity information, the data packet byte sum quantity information, the check bits, the end-of-packet identification code, a sub-packet identification code and the sub-packet length information can be preset quantity of bytes, and an arrangement sequence thereof can be determined according to actual requirements. For example, a data packet can be encapsulated according to an order and a structure of a 4-byte header identification code, a 2-byte sub-packet quantity information, a 2-byte data packet byte sum quantity information, a 4-byte check bit, a sub-packet portion requiring a preset quantity of bytes, and a 4-byte end-of-packet packet identification code. The header identification codes are 4 ASCII characters, e.g., B, r, n, and C, which facilitate the positioning of possible starting markers in streaming transmission; 2 bytes behind the header identification code are the sub-packet quantity information, indicating how many sub-packets are included in the data packet, the 2 bytes being unsigned integers, and a high byte being in front. Behind the sub-packets quantity information is the 2 bytes data packet byte sum information with which a data byte quantity of the whole data packet is identified, the 2 bytes are unsigned integers with a high byte being in front, and the byte sum quantity is calculated from a header byte of the header identification code until a tail byte of the end-of-packet identification code. The 4-byte check bit is arranged behind the sum byte quantity information, and the check adopts a bitwise XOR operation, and is acquired by XOR operating the BrnC and the following four bytes byte-by-byte. Behind the check bit there is the sub-packet portion, and the sub-packet portion includes at least two bytes of sub-packet header identification code, 2 bytes of loading byte quantity information and sub-packet loading information which are the actual loading content information of the sub-packet. In this embodiment, the sub-packet header identification codes include, but are not limited to the ASCII codes or human readable chars and the like. The byte quantity information of the sub-packet loading identifies the byte quantity of the sub-packet loading information, that is, the byte quantity of the actual loading content. The sub-packet portion may include one or more sub-packets. The sub-packet portion is followed by the 4-byte end-of-packet identification code, which may be, for example, P, K, E, and D, etc. When the transmitting terminal generates a data packet, the data packet is transmitted to the receiving terminal.

In operation S20, the received data packet is parsed by the receiving terminal according to a preset parsing rule, and the at least one sub-packet in the data packet is extracted.

Based on the above operations, when the receiving terminal receives the data stream transmitted by the transmitting terminal, the received data stream is parsed according to the preset parsing rule, and the sub-packets in the data stream are extracted. In the embodiment, the preset parsing rule refer to a rule set in advance that the transmitting terminal parses the data stream.

In the embodiment, the parsing rule can be determined based on a principle that: a data block consistent with the preset header identification code is acquired from a data stream, the data block is taken as a starting mark, and information of each part of the data packet is acquired and checked based on the quantity of bytes, and the arrangement sequence of the quantity information of the sub-packets, the sum quantity information of the data packet bytes, the check bit and the sub-packets in the generation rules, and the sub-packets in the data packet are extracted. Specifically, it is assumed that each part of the data packet is respectively the 4-byte header identification codes (in a order of B, r, n and C), 2-byte sub-packet quantity information, the 2-byte data packet byte sum information, the 4-byte check bits, the sub-packets, and the 4-byte end-of-packet identification codes in the arrangement sequence. The receiving terminal first sets an initial state to be a reset state with all counters are clear. When the data stream transmitted by the transmitting terminal is received, the receiving terminal continuous judges from the data stream and acquires the continuous four characters B, r, n and C. When the data block consistent with the header identification code is acquired, namely a data block 1 of the continuous four characters B, r, n and C, an 8-byte data block 2 is acquired beginning from the first byte behind the data block 1 and is checked. During verification, the header identification code is XOR-operated with the first 4-byte data of the data block 2 to obtain a XOR operation result, whether the XOR operation result is consistent with the last 4-byte data in the data block 2 or not is judged, if the XOR operation result is inconsistent with the last 4-byte data in the data block 2, an error is proved, and the first byte data behind the B-byte data in the data block 1 is re-acquired, and the continuous four characters B, r, n and C are respectively re-acquired.

If the XOR operation result is consistent with the last 4-byte data in the data block 2, a correct is proved. The sub-packet quantity information is acquired from the first 2-byte data in the data block 1. The sum byte quantity of data packets is acquired from subsequent 2-byte data, sub-packet loop detection is performed based on the data packet byte sum information and the sub-packet quantity information and from the data behind the data block 2. Each sub-packet header identification code and each sub-packet loading byte quantity information are read, and a sub-packet structure object is established. Based on the sum quantity of packet bytes and the packet header. byte quantity of Sub-Packet quantity information, the sum of the byte quantity of the data packet byte sum information and the byte quantity of the check bit, it determines the sum of the byte quantity of the sub-packets and the end-of-packet identification code, which is the difference of the sum quantity of data packet bytes minus 12 in the present embodiment, a value of a subtraction counter 1 is set to be the sum of the byte quantity of the sub-packet and the end-of-packet identification code, a value of a subtraction counter 2 is set to be a value of sub-packet loading bytes of a current read sub-packet, a value of a subtraction counter 3 is set to be a value of the quantity of sub-packets. Beginning from the reading of the sub-packet identification code after the check bits, when one byte data is read, the value of the subtraction counter 1 is reduced by 1. Beginning from the reading of the sub-packet loading information behind the sub-packet loading byte quantity information data block, when one byte data is read, the value of the subtraction counter 2 is reduced by 1. When the value of the subtraction counter 2 is 0, the value of the subtraction counter 3 is reduced by 1 and executes the data reading of the next sub-packet. When the value of the subtraction counter 3 is 0, the sub-packet loop detection is exited. Of course, in the present embodiment, a check bit can also be added to each sub-packet when generating a data packet, and each sub-packet is verified for each time being read.

In operation S30, a data packet object is created by the receiving terminal and an internal link to each extracted sub-packet is established.

Based on the above operation, when the sub-packet loop detection is exited, it is judged whether the value of the subtraction counter 1 is 4, and if not, the data packet extraction fails, then starting from the first byte data behind B byte in the data block 1, and re-acquiring the continuous four characters B, r, n and C respectively. If the value of the subtraction counter 1 is 4, it is confirmed whether the last four byte data is consistent with the end-of-packet identification code. In this embodiment, it is determined whether the last four bytes data are P, K, E and D. If so, the receiving terminal creates a data packet object and establishes an internal link to each extracted sub-packet, such as a pointer or application.

In the embodiment, a transmitting terminal generates a data packet according to preset generation rule, and sends the data packet to a receiving terminal in a streaming transmission mode, In particular, the data packet at least includes a header identification code, a sub-packet quantity information, a data packet byte sum quantity information, a check bit, at least one sub-packet and an end-of-packet identification code. The receiving terminal parses the received data packet according to a preset parsing rule to extract sub-packets in the data packet; a receiving terminal creates a data packet object, and establishes an internal link to each extracted sub-packet. By means of the above method, the data packet generated based on the generation rule in the present disclosure includes a header identification code and an end-of-packet identification code, so that the starting position and the ending position of the data are determined in the data transmission process, the structure of the data packet and the position of the sub-packet can be accurately determined based on the sub-packet quantity information, the data packet byte sum information and the check bits in the parsing process, the sub-packet in the data packet is accurately extracted, and the situation that the data structure is disordered is avoided.

Figure 3:
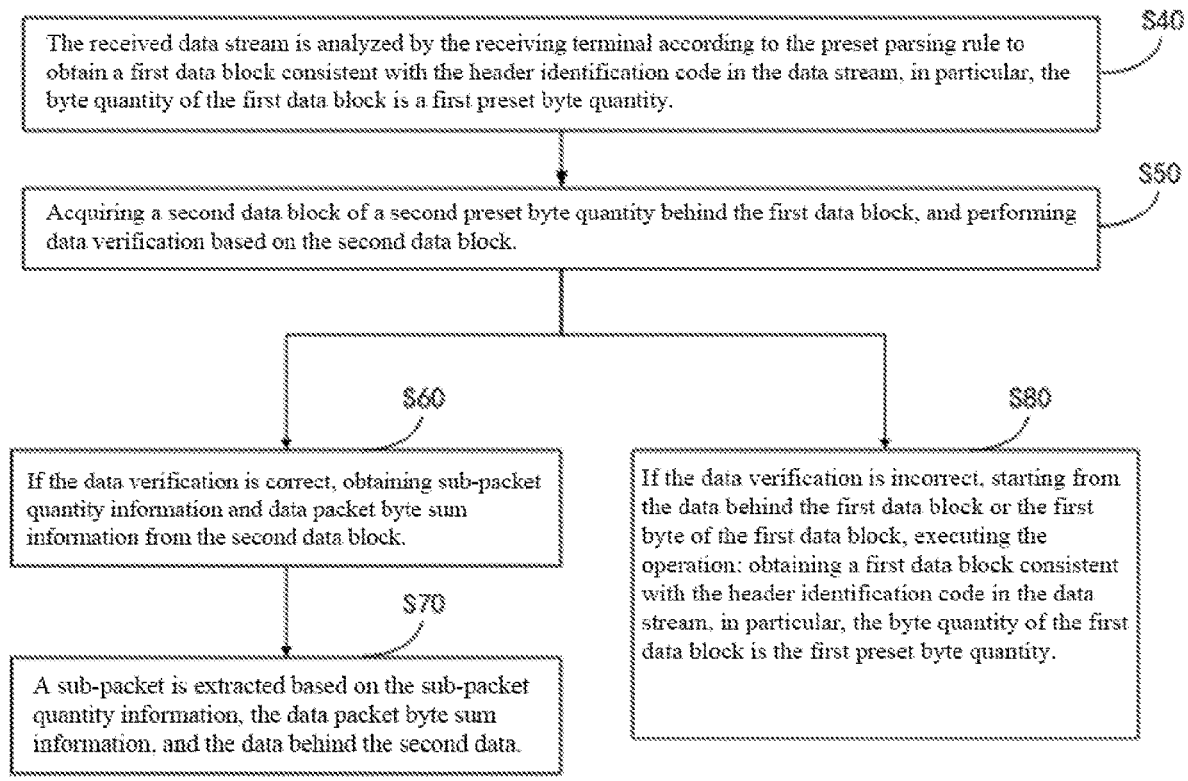
FIG. 3 is an illustrative flowchart of a second embodiment of a data transmission method according to the present disclosure.

Further, referring to FIG. 3, FIG. 3 is an illustrative flow diagram of a second embodiment of the data transmission method of the present disclosure. Based on the above embodiment, in the present embodiment, the operation S20 includes:

operation S40, the received data stream is analyzed by the receiving terminal according to the preset parsing rule to obtain a first data block consistent with the header identification code in the data stream, in particular, the byte quantity of the first data block is a first preset byte quantity;

Step S50, acquiring a second data block of a second preset byte quantity behind the first data block, and performing data verification based on the second data block;

Step S60, if the data verification is correct, obtaining sub-packet quantity information and data packet byte sum information from the second data block;

Step S70, a sub-packet is extracted based on the sub-packet quantity information, the data packet byte sum information, and the data behind the second data block.

Step S80, If the data verification is incorrect, starting from the data behind the first data block or the first byte of the first data block, executing the operation: obtaining a first data block consistent with the header identification code in the data stream, in particular, the byte quantity of the first data block is the first preset byte quantity.

Based on the above embodiments, in the present embodiment, the packet header is encoded into a preset code for identifying the possible starting position of the data packet, and is ASCII characters.

When the receiving terminal receives the data stream transmitted by the transmitting terminal, the received data stream is parsed according to the preset parsing rule, and the sub-packets in the data stream are extracted. In the embodiment, the preset parsing rule refers to the rule that the transmitting terminal presets to parse the preset data stream. In the embodiment, the parsing rule can be determined based on the principle that a data block consistent with a preset header identification code is acquired from a data stream, the data block is taken as a starting mark, and information of each part of the data packet is acquired and checked based on the quantity of bytes, and the arrangement sequence of the quantity information of the sub-packets, the sum quantity information of the data packet bytes, the check bit and the byte quantity of the sub-packets in the generation rule, and the sub-packets in the data packet are extracted. In particular, it is assumed that when each part of the data packet is respectively the 4-byte header identification codes (in a sequence of B, r, n and C), the 2-byte sub-packet quantity information, the 2-byte data packet byte sum information, the 4-byte check bits, the sub-packets, and the 4-byte end-of-packet identification codes in the arrangement sequence. The receiving terminal first sets an initial state to be a reset state with all counters are clear. When the data stream transmitted by the transmitting terminal is received, the receiving terminal continuously judges from the data stream, and acquires the continuous four characters are B, r, n and C. When a data block consistent with the header identification code is acquired, namely a data block 1 with the continuous four characters B, r, n and C, and an 8-byte data block 2 is acquired beginning from the first byte behind the data block 1 and is checked. During verification, the header identification code is XOR-operated with the first 4-byte data of the data block 2 to obtain a XOR operation result, whether the XOR operation result is consistent with the last 4-byte data in the data block 2 or not is judged, if the XOR operation result is inconsistent with the last 4-byte data in the data block 2, an error is proved, and the first byte data behind the B-byte data in the data block 1 is re-acquired, and the continuous four characters B, r, n and C are respectively re-acquired. In the preset embodiment, when packet header identification codes are same ASCII codes of preset number, in case of error checking, four continuous characters from the first data byte after B-byte in the data block 1 and which are respectively B, R. N and C are re-acquired. If the packet headers are encoded with different ASCII codes of preset number, in case of error checking, four continuous characters from the first byte of the data block 1 and which are B, R, N and C are re-acquired.

If the XOR operation result is consistent with the last 4-byte data in the data block 2, a correct is proved. The sub-packet quantity information is acquired from the first 2-byte data in the data block 1. The sum byte quantity of data packets is acquired from subsequent 2-byte data, sub-packet loop detection is performed based on the data packet byte sum information and the sub-packet quantity information and from the data behind the data block 2. Each sub-packet header identification code and each sub-packet loading byte quantity information are read, a sub-packet structure object is established. Based on the sum quantity of packet bytes and the packet header. byte quantity of Sub-Packet quantity information, the sum of the byte quantity of the data packet byte sum information and the byte quantity of the check bit, it determines the sum of the byte quantity of the sub-packets and the end-of-packet identification code, which is the difference of the sum quantity of data packet bytes minus 12 in the present embodiment, a value of a subtraction counter 1 is set to be the sum of the byte quantity of the sub-packet and the end-of-packet identification code, a value of a subtraction counter 2 is set to be a value of sub-packet loading bytes of a current read sub-packet, a value of a subtraction counter 3 is set to be a value of the quantity of sub-packets. Beginning from the reading of the sub-packet identification code after the check bits, when one byte data is read, the value of the subtraction counter 1 is reduced by 1. Beginning from the reading of the sub-packet loading information behind the sub-packet loading byte quantity information data block, when one byte data is read, the value of the subtraction counter 2 is reduced by 1. When the value of the subtraction counter 2 is 0, the value of the subtraction counter 3 is reduced by 1 and executes the data reading of the next sub-packet. When the value of the subtraction counter 3 is 0, the sub-packet loop detection is exited. It is judged whether the value of the subtraction counter 1 is 4, and if not, the data packet extraction fails, then starting from the first byte data behind B byte in the data block 1, and re-acquiring the continuous four characters B, r, n and C respectively. If the value of the subtraction counter 1 is 4, it is confirmed whether the last four byte data is consistent with the end-of-packet identification code. In this embodiment, it is determined whether the last four bytes data are P, K, E and D. If so, the receiving terminal creates a data packet object and establishes an internal link to each extracted sub-packet, such as a pointer or application. Of course, in the present embodiment, the sub-packet may not include the sub-packet header identification code or the sub-packet loading byte quantity information, and the sub-packet identification information may also be added at a sub-packet tail or other preset position, and the sub-packet is extracted based on the sub-packet identification information behind verification.

In the embodiment, the receiving terminal analyzes the received data stream according to the preset parsing rule to obtain the first data block consistent with the header identification code in the data stream, in particular, the byte quantity of the first data block is the first preset byte quantity; acquiring a second data block of a second preset byte quantity behind the first data block, and performing data verification based on the second data block; if the data verification is correct, obtaining sub-packet quantity information and data packet byte sum information from the second data block; and extracting sub-packets based on the sub-packet quantity information, the data packet byte sum information and the data behind the second data block. In this way, the data packet structure can be accurately determined, and the sub-packet can be accurately positioned and extracted.

Figure 4:
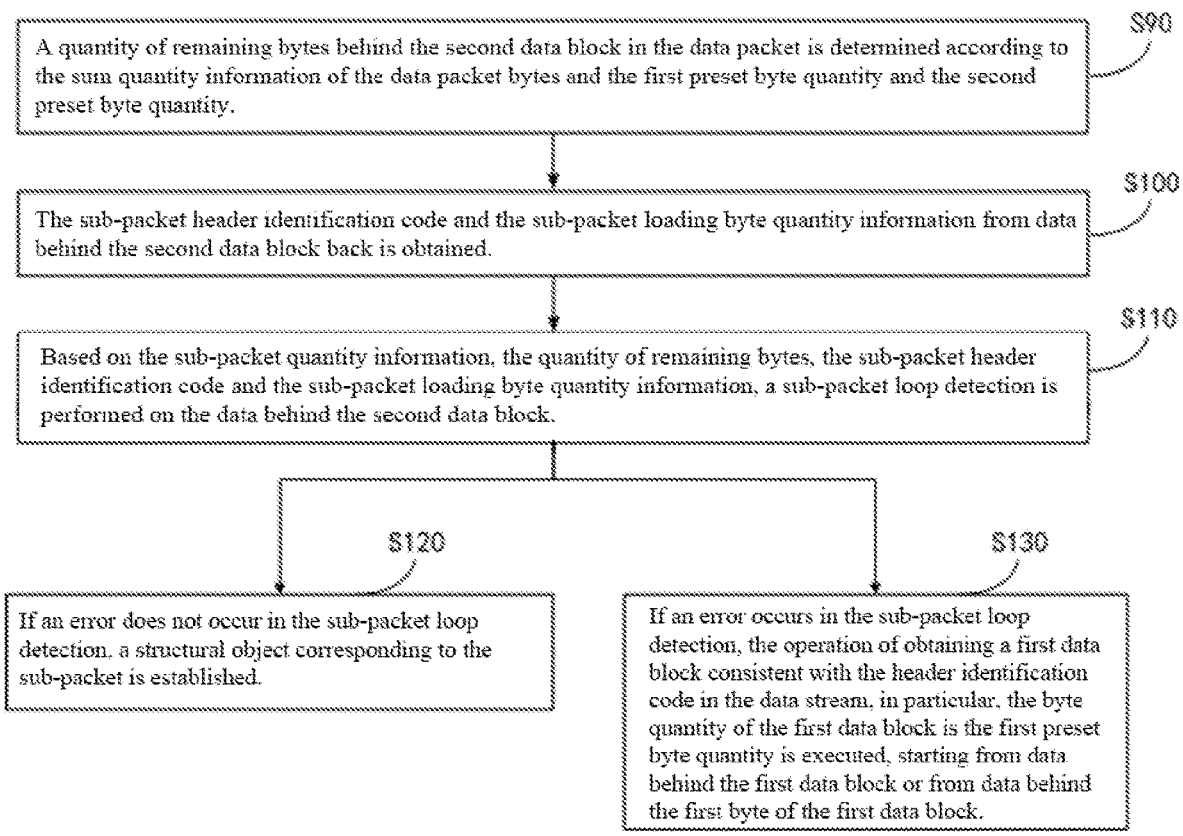
FIG. 4 is an illustrative flowchart of a third embodiment of a data transmission method according to the present disclosure.

Further, referring to FIG. 4, FIG. 4 is an illustrative flowchart of a third embodiment of a data transmission method according to the present disclosure. Based on the above embodiments of the data transmission method of the present disclosure, a third embodiment of the present disclosure is proposed.

Based on the above embodiments, in the present embodiment, the sub-packet includes at least a sub-packet header identification code and sub-packet loading byte quantity information, and the operation S70 includes the following operations.

Step S90, a quantity of remaining bytes behind the second data block in the data packet is determined according to the sum quantity information of the data packet bytes and the first preset byte quantity and the second preset byte quantity.

Step S100, the sub-packet header identification code and the sub-packet loading byte quantity information from data behind the second data block back is obtained.

Step S110, based on the sub-packet quantity information, the quantity of remaining bytes, the sub-packet header identification code and the sub-packet loading byte quantity information, a sub-packet loop detection is performed on the data behind the second data block.

Step S120, if an error does not occur in the sub-packet loop detection, a structural object corresponding to the sub-packet is established.

Step S130, if an error occurs in the sub-packet loop detection, the operation of obtaining a first data block consistent with the header identification code in the data stream, in particular, the byte quantity of the first data block is the first preset byte quantity is executed, starting from data behind the first data block or from data behind the first byte of the first data block.

Based on the above embodiments, in the present embodiment, the sum of the quantity of remaining bytes refers to the sum of the byte quantity of the sub-packet portion and the end-of-packet identification code, and the sum of the quantity of remaining bytes is equal to the sum quantity of the data packet bytes minus the first preset byte quantity and the second preset byte quantity, namely the difference between the sum quantity of the data packet bytes and the first preset byte quantity and the second preset byte quantity. Based on the above embodiment, in this embodiment, when the verification is correct, the sub-packet quantity information is acquired from the first 2-byte data in the data block 1. The sum byte quantity of data packets is acquired from subsequent 2-byte data, sub-packet loop detection is performed based on the data packet byte sum information and the sub-packet quantity information and from the data behind the data block 2. Each sub-packet header identification code and each sub-packet loading byte quantity information are read, and a sub-packet structure object is established. Based on the sum quantity of packet bytes and the packet header. byte quantity of sub-packet quantity information, the sum of the byte quantity of the data packet byte sum information and the byte quantity of the check bit, it determines the sum of the byte quantity of the sub-packets and the end-of-packet identification code, which is the difference of the sum quantity of data packet bytes minus 12 in the present embodiment, a value of a subtraction counter 1 is set to be the sum of the byte quantity of the sub-packet and the end-of-packet identification code, a value of a subtraction counter 2 is set to be a value of sub-packet loading bytes of a current read sub-packet, a value of a subtraction counter 3 is set to be a value of the quantity of sub-packets. Beginning from the reading of the sub-packet identification code after the check bits, when one byte data is read, the value of the subtraction counter 1 is reduced by 1. Beginning from the reading of the sub-packet loading information behind the sub-packet loading byte quantity information data block, when one byte data is read, the value of the subtraction counter 2 is reduced by 1. When the value of the subtraction counter 2 is 0, the value of the subtraction counter 3 is reduced by 1 and executes the data reading of the next sub-packet. When the value of the subtraction counter 3 is 0, the sub-packet loop detection is exited. It is judged whether the value of the subtraction counter 1 is 4, if not, the data packet extraction fails, then starting from the first byte data behind B byte in the data block 1, and re-acquiring the four continuous characters B, r, n and C respectively. If the value of the subtraction counter 1 is 4, it is confirmed whether the last four byte data is consistent with the end-of-packet identification code. In this embodiment, it is determined whether the last four bytes data are P, K, E and D. If so, the receiving terminal creates a data packet object and establishes an internal link to each extracted sub-packet, such as a pointer or application. Of course, in the present embodiment, the sub-packet may not include the sub-packet header identification code or the sub-packet loading byte quantity information, and the sub-packet identification information may also be added at a sub-packet tail or other preset position, and the sub-packet is extracted based on the sub-packet identification information behind verification. In the present embodiment, even if the data block 1 is consistent with the header identification code, and the verification proves it is correct. It is also possible to extract a wrong packet header identification code. Namely, the data block 1 is not the packet header of the data packet, so that the sub-packet loop detection error is caused when error occurs during extracting the packet header identification code. For example, reading that the data block read at the position of the sub-packet header identification code of the sub-packet is inconsistent with the preset sub-packet header identification code, when this occurs, restarting from the first byte data behind the B byte of the data block 1 or the first byte data behind the data block 1, the continuous four characters B, R, N, and C, are respectively re-acquired.

In the embodiment, the sub-packet at least includes a sub-packet header identification code and a sub-packet loading byte quantity information, and the quantity of remaining bytes behind the second data block in the data packet is determined according to the data packet byte sum quantity information and the first preset byte quantity and the second preset byte quantity; the sub-packet header identification code and the sub-packet loading byte quantity information are acquired from data behind the second data block; and based on the sub-packet quantity information, the remaining byte quantity, the sub-packet header identification code and the sub-packet loading byte quantity information, the sub-packet loop detection on the data behind the second data block are performed, and a structural object is established corresponding to the sub-packet. In this way, the initial position of the sub-packet can be determined through the sub-packet header identification code. By using the sub-packet header identification code and the sub-packet loading data information, the position of the sub-packet can be more accurately identified and located, the sub-packet can be accurately extracted, and the data structure confusion of the sub-packet is avoided.

Figure 5:
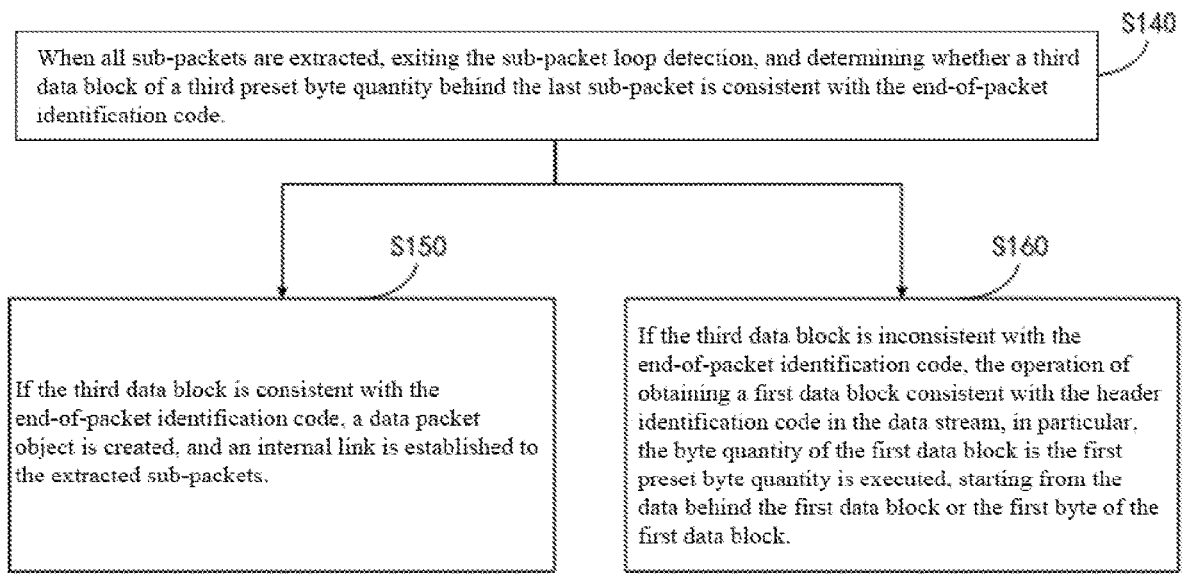
FIG. 5 is an illustrative flowchart of a fourth embodiment of a data transmission method according to the present disclosure.

Further, referring to FIG. 5, FIG. 5 is an illustrative flowchart of a fourth embodiment of the data transmission method of the present disclosure.

Based on the above embodiments, in the present embodiment, the operation S120 further includes the following operations.

Step S140, when all sub-packets are extracted, exiting the sub-packet loop detection, and determining whether a third data block of a third preset byte quantity behind the last sub-packet is consistent with the end-of-packet identification code.

Step S150, if the third data block is consistent with the end-of-packet identification code, a data packet object is created, and an internal link is established to the extracted sub-packets.

Step S160, if the third data block is inconsistent with the end-of-packet identification code, the operation of obtaining a first data block consistent with the header identification code in the data stream, in particular, the byte quantity of the first data block is the first preset byte quantity is executed, starting from the data behind the first data block or the first byte of the first data block.

Based on the above embodiments, in the present embodiment, for each sub-packet detection, if no error occurs, a sub-packet structure object is established to extract the sub-packet.

When all sub-packet extraction is completed, namely the values of the subtraction counter 1 and 2 are 0, the sub-packet loop detection is exited, and the data block 3 of the third preset byte quantity is acquired sequentially from data behind the last sub-packet. In the embodiment, the third preset byte quantity is consistent with the byte quantity of the preset end-of-packet identification code. When the data block 3 is acquired, the data block 3 is determined to be consistent with the preset end-of-packet identification code. When the data block 3 is consistent with the preset end-of-packet identification code, a data packet object is established, and an internal link to the extracted sub-packets is established, and if the data block 3 is inconsistent with the preset end-of-packet identification code, a first data block started from the data behind the first data block or from the data behind the first byte of the first data block, which is consistent with the header identification code is acquired in the data stream, in particular, the byte quantity of the first data block is the first preset byte quantity to re-determine the header identification code of the data packet. Specifically, the value of the subtraction counter 1 is set to be the sum of the byte quantity of the sub-packet and the end-of-packet identification code, the value of the subtraction counter 2 is set to be the quantity of sub-packet loading bytes of the current read sub-packet, the value of the subtraction counter 3 is set to the value of the quantity of sub-packets. Beginning from the reading of the sub-packet identification code after the check bits, when one byte data is read, the value of the subtraction counter 1 is reduced by 1. Beginning from the reading of the sub-packet loading information behind the sub-packet loading byte quantity information data block, when one byte data is read, the value of the subtraction counter 2 is reduced by 1. When the value of the subtraction counter 2 is 0, the value of the subtraction counter 3 is reduced by 1 and executes the data reading of the next sub-packet. When the value of the subtraction counter 3 is 0, the sub-packet loop detection is exited. Of course, in the present embodiment, a check bit can also be added to each sub-packet when generating a data packet, and each sub-packet is verified for each time being read. When the values of the subtraction counter 2 and the subtraction counter 3 are 0, whether the value of the subtraction counter 1 is consistent with the byte quantity of the preset sub-packet identification code is determined. If the value of the subtraction counter 1 is consistent with the byte quantity of the preset sub-packet identification code, determining whether the data on each byte bit is consistent with the data on the code byte bit of the corresponding end-of-packet identification code, creating a data packet object if the third data block is consistent with the end-of-packet identification code, and establishing an internal link to the extracted sub-packet, in particular, the internal link includes a pointer or a reference. If the value of the subtraction counter 1 is inconsistent with the byte quantity of the preset sub-packet identification code or the data on each byte bit is inconsistent with the data on the byte bit of the corresponding end-of-packet identification code, the continuous four characters B, R, N and C started from the first byte data behind the data block 1 or behind the B byte of the data block 1 are re-acquired.

In the embodiment, when all sub-packet extraction is completed, the sub-packet loop detection is exited, and whether a third data block of a third preset byte quantity behind the last sub-packet is consistent with the end-of-packet identification code is determined. If the third data block is consistent with the end-of-packet identification code, a data packet object is created, and an internal link is established to the extracted sub-packet. By means above, whether the data packet is correctly parsed or not is utilized to improve the correct rate of data packet analysis, and when an error occurs, starting from the data behind the first data block or from the data behind the first byte of the first data block, the operation: the first data block consistent with the header identification code in the data stream is acquired, in particular, the byte quantity of the first data block is the first preset byte quantity is executed, thereby preventing to give up all the data, and the data utilization rate is improved.

In addition, the disclosure also provides a data transmission device.

The data transmission device at least includes a storage, a processor and a data transmission program stored on the storage, in particular, when the data transmission program is executed by the processor, a data transmission method is carried out.

The data transmission method carried out by the processor when the data transmission program is running on the processor can refer to various embodiments of the data transmission method of the present disclosure, and will not be repeated here.

In addition, the embodiment of the disclosure also provides a computer readable storage medium.

The computer readable storage medium of the present disclosure stores a data transmission program which, when is executable by a processor to carry out a data transmission method.

The data transmission method carried out by the processor when the data transmission program running on the processor can refer to various embodiments of the data transmission method of the present disclosure, and will not be repeated here.

It should be noted that in this disclosure, the terms "include", "comprise" or any other variants thereof are intended to cover non-exclusive inclusion, so that a process, method, article or system including a series of elements not only includes those elements, It also includes other elements that are not explicitly listed, or elements inherent to the process, method, article, or system. If there are no more restrictions, the element defined by the sentence "including a . . . " does not exclude the existence of other identical elements in the process, method, article or system that includes the element.

The serial quantities of the embodiments of the present disclosure are described merely for the purpose of description and do not represent the disadvantages of the embodiments.

Through the description of the embodiments above, it will be clear to those skilled in the art that the above-described embodiments can be realized by means of a software-plus-necessary general-purpose hardware platform, although, of course, the former can be implemented in hardware, but in many cases the former is a better embodiment. Based on such an understanding, the technical solutions of the present disclosure may be embodied in the form of a software product that is embodied in a software product that is stored in a storage medium (e.g., a ROM/RAM, a magnetic disk, an optical disk) as described above, including several instructions for causing a terminal device (which may be a cell phone, a computer, a server, an air conditioner, or a network device, etc.) to perform the method of various embodiments of the present disclosure.

The above are only preferred embodiments of this disclosure, and do not limit the scope of this disclosure. Any equivalent structure or equivalent process transformation made using the content of the description and drawings of this disclosure, or directly or indirectly used in other related technical fields, are included in the scope of patent protection of this disclosure.

What is claimed is:

1. A data transmission method, comprising:
generating, by a transmitting terminal, a data packet according to a preset generation rule, and transmitting the data packet to a receiving terminal via streaming, wherein the data packet at least comprises a header identification code, sub-packet quantity information, data packet byte sum quantity information, a check bit, at least one sub-packet and an end-of-packet identification code;
parsing, by the receiving terminal, the data packet according to a preset parsing rule to extract the at least one sub-packet in the data packet; and
creating, by the receiving terminal, a data packet object, and establishing an internal link to each extracted sub-packet; wherein,
the operation of parsing, by the receiving terminal, the data packet according to a preset parsing rule to extract the at least one sub-packet in the data packet comprises:
parsing, by the receiving terminal, received data stream according to the preset parsing rule, obtaining a first data block which is the same as the header identification code in the data stream, wherein a byte quantity of the first data block is a first preset byte quantity;
obtaining a second data block of a second preset byte quantity behind the first data block, and performing data verification based on the second data block;

when the data verification is correct, obtaining the sub-packet quantity information and the data packet byte sum quantity information from the second data block;

extracting the at least one sub-packet based on the sub-packet quantity information, the data packet byte sum quantity information, and data behind the second data block;

wherein each of the at least one sub-packet at least comprises a sub-packet header identification code, and sub-packet loading byte quantity information, the operation of extracting the at least one sub-packet based on the sub-packet quantity information, the data packet byte sum quantity information, and the data behind the second data block comprises:

determining a remaining byte quantity behind the second data block of the data packet based on the data packet byte sum quantity information and the first preset byte quantity and the second preset byte quantity;

obtaining the sub-packet header identification code and the sub-packet loading byte quantity information from the data behind the second data block;

performing a sub-packet loop detection on the data behind the second data block based on the sub-packet quantity information, the remaining byte quantity, the sub-packet header identification code and the sub-packet loading byte quantity information;

when there is not an error in the sub-packet loop detection, establishing a structural object corresponding to the at least one sub-packet.

2. The data transmission method of claim 1, wherein, after the operation of obtaining a second data block of a second preset byte quantity behind the first data block, and performing data verification based on the second data block, the data transmission method further comprises:

when the data verification is incorrect, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

3. The data transmission method of claim 1, wherein after the operation of performing a sub-packet loop detection on the data behind the second data block based on the sub-packet quantity information, the remaining byte quantity, the sub-packet header identification code and the sub-packet loading byte quantity information, the data transmission method further comprises:

when there is an error in the sub-packet loop detection, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

4. The data transmission method of claim 1, wherein after the operation of when there is not an error in the sub-packet loop detection, establishing a structural object corresponding to the at least one sub-packet, the data transmission method further comprises:

when the at least one sub-packet is completely extracted, exiting the sub-packet loop detection, and determining whether a third data block of a third preset byte quantity behind a last sub-packet is consistent with the end-of-packet identification code;

when the third data block is consistent with the end-of-packet identification code, establishing the data packet object, and establishing the internal link to each extracted sub-packet.

5. The data transmission method of claim 4, wherein after the operation of when the at least one sub-packet is completely extracted, exiting the sub-packet loop detection, and determining whether a third data block of a third preset byte quantity behind a last sub-packet is consistent with the end-of-packet identification code, the data transmission method further comprises;

when the third data block of h third preset byte quantity behind the last sub-packet is in inconsistent with the end-of-packet identification code, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

6. A data transmission device, wherein the data transmission device at least comprises a storage, a processor, and a data transmission program stored on the storage, when the data transmission program is performed by the processor, following operations are realized:

generating, by a transmitting terminal, a data packet according to a preset generation rule, and transmitting the data packet to a receiving terminal via streaming, wherein the data packet at least comprises a header identification code, sub-packet quantity information, data packet byte sum quantity information, a check bit, at least one sub-packet and an end-of-packet identification code;

parsing, by the receiving terminal, the data packet according to a preset parsing rule to extract the at least one sub-packet in the data packet;

creating, by the receiving terminal, a data packet object, and establishing an internal link to each extracted sub-packet; wherein, when the data transmission program is performed by the processor, following operations are also realized:

parsing, by the receiving terminal, received data stream according to the preset parsing rule, obtaining a first data block which is the same as the header identification code in the data stream, wherein a byte quantity of the first data block is a first preset byte quantity;

obtaining a second data block of a second preset byte quantity behind the first data block, and performing data verification based on the second data block;

when the data verification is correct, obtaining the sub-packet quantity information and the data packet byte sum quantity information from the second data block;

extracting the at least one sub-packet based on the sub-packet quantity information, the data packet byte sum quantity information, and data behind the second data block;

wherein each of the at least one sub-packet at least comprises a sub-packet header identification code, and sub-packet loading byte quantity information, when the data transmission program is performed by the processor, following operations are also realized:

determining a remaining byte quantity behind the second data block of the data packet based on the data packet byte sum quantity information and the first preset byte quantity and the second preset byte quantity;

obtaining the sub-packet header identification code and the sub-packet loading byte quantity information from the data behind the second data block;

performing a sub-packet loop detection on the data behind the second data block based on the sub-packet quantity information, the remaining byte quantity, the sub-packet header identification code and the sub-packet loading byte quantity information;

when there is not an error in the sub-packet loop detection, establishing a structural object corresponding to the at least one sub-packet.

7. The data transmission device of claim 6, wherein when the data transmission program is performed by the processor, a following operation is further realized:

when the data verification is incorrect, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

8. The data transmission device of claim 6, wherein when the data transmission program is performed by the processor, a following operation is realized:

when there is an error in the sub-packet loop detection, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

9. The data transmission device of claim 6, wherein when the data transmission program is performed by the processor, following operations are realized:

when the at least one sub-packet is completely extracted, exiting the sub-packet loop detection, and determining whether a third data block of a third preset byte quantity behind a last sub-packet is consistent with the end-of-packet identification code;

when the third data block is consistent with the end-of-packet identification code, establishing the data packet object, and establishing the internal link to each extracted sub-packet.

10. The data transmission device of claim 9, wherein when the data transmission program is performed by the processor, a following operation is executed:

when the third data block of the third preset byte quantity behind the last sub-packet is in inconsistent with the end-of-packet identification code, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

11. A non-transitory computer readable storage medium, wherein a data transmission program is stored in the non-transitory computer readable storage medium, when the data transmission program is executed by a processor, following operations are realized:

generating, by a transmitting terminal, a data packet according to a preset generation rule, and transmitting the data packet to a receiving terminal via streaming, wherein the data packet at least comprises a header identification code, sub-packet quantity information, data packet byte sum quantity information, a check bit, at least one sub-packet and an end-of-packet identification code;

parsing, by the receiving terminal, the data packet according to a preset parsing rule to extract the at least one sub-packet in the data packet;

creating, by the receiving terminal, a data packet object, and establishing an internal link to each extracted sub-packet; wherein, when the data transmission program is executed by the processor, following operations are also realized:

parsing, by the receiving terminal, received data stream according to the preset parsing rule, obtaining a first data block which is the same as the header identification code in the data stream, wherein a byte quantity of the first data block is a first preset byte quantity;

obtaining a second data block of a second preset byte quantity behind the first data block, and performing data verification based on the second data block;

when the data verification is correct, obtaining the sub-packet quantity information and the data packet byte sum quantity information from the second data block;

extracting the at least one sub-packet based on the sub-packet quantity information, the data packet byte sum quantity information, and data behind the second data block;

wherein each of the at least one sub-packet at least comprises a sub-packet header identification code, and sub-packet loading byte quantity information, when the data transmission program is executed by the processor, following operations are realized:

determining a remaining byte quantity behind the second data block of the data packet based on the data packet byte sum quantity information and the first preset byte quantity and the second preset byte quantity;

obtaining the sub-packet header identification code and the sub-packet loading byte quantity information from the data behind the second data block;

performing a sub-packet loop detection on the data behind the second data block based on the sub-packet quantity information, the remaining byte quantity, the sub-packet header identification code and the sub-packet loading byte quantity information;

when there is not an error in the sub-packet loop detection, establishing a structural object corresponding to the at least one sub-packet.

12. The non-transitory computer readable storage medium of claim 11, wherein when the data transmission program is executed by the processor, a following operation is realized:

when the data verification is incorrect, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

13. The non-transitory computer readable storage medium of claim 11, wherein when the data transmission program is executed by the processor, a following operation is realized:
    when there is an error in the sub-packet loop detection, performing the operation of obtaining a first data block which is the same as the header identification code in the data stream, wherein the byte quantity of the first data block is the first preset byte quantity, wherein the first data block obtained in this operation is obtained from data behind the first data block obtained in a previous operation or from data behind a first byte of the first data block obtained in the previous operation.

14. The non-transitory computer readable storage medium of claim 11, wherein when the data transmission program is executed by the processor, following operations are realized:
    when the at least one sub-packet is completely extracted, exiting the sub-packet loop detection, and determining whether a third data block of a third preset byte quantity behind a last sub-packet is consistent with the end-of-packet identification code;
    when the third data block is consistent with the end-of-packet identification code, establishing the data packet object, and establishing the internal link to each extracted sub-packet.

\* \* \* \* \*